(12) United States Patent
Friese et al.

(10) Patent No.: US 12,528,054 B2
(45) Date of Patent: Jan. 20, 2026

(54) INTEGRITY TEST FOR A DOUBLE FILTER CAPSULE

(71) Applicant: Sartorius Stedim Biotech GmbH, Göttingen (DE)

(72) Inventors: Thomas Friese, Göttingen (DE); Mario Strauss, Göttingen (DE); Katrin Müller, Göttingen (DE); Thomas Loewe, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 209 days.

(21) Appl. No.: 18/259,032

(22) PCT Filed: Dec. 22, 2021

(86) PCT No.: PCT/EP2021/087327
§ 371 (c)(1),
(2) Date: Jun. 22, 2023

(87) PCT Pub. No.: WO2022/136565
PCT Pub. Date: Jun. 30, 2022

(65) Prior Publication Data
US 2024/0042392 A1 Feb. 8, 2024

(30) Foreign Application Priority Data
Dec. 23, 2020 (EP) .................................. 20216785

(51) Int. Cl.
*B01D 65/10* (2006.01)
*B01D 29/11* (2006.01)
*B01D 29/56* (2006.01)

(52) U.S. Cl.
CPC .......... *B01D 65/104* (2013.01); *B01D 29/114* (2013.01); *B01D 29/56* (2013.01)

(58) Field of Classification Search
CPC .......... G01N 2015/084; G01D 65/104; G01D 29/56; G01D 29/114
(Continued)

(56) References Cited

U.S. PATENT DOCUMENTS

| 5,594,161 | A | * | 1/1997 | Randhahn | ............ | B01D 29/114 |
| | | | | | | 73/38 |
| 6,327,893 | B1 | * | 12/2001 | Choi | .................... | B01D 46/521 |
| | | | | | | 210/489 |

(Continued)

FOREIGN PATENT DOCUMENTS

| WO | WO-2018050919 | A9 | * | 1/2019 | ........... | G01N 29/024 |
| WO | WO-2020100171 | A1 | * | 5/2020 | ............. | G01M 3/38 |

OTHER PUBLICATIONS

International Search Report and Written Opinion, mailed Jun. 28, 2022, issued for International Patent Application No. PCT/EP2021/087327, 15 pages (with English translation).

*Primary Examiner* — John Fitzgerald
(74) *Attorney, Agent, or Firm* — Klarquist Sparkman, LLP (57) ABSTRACT

A method for providing an integrity test of a double filter capsule can include providing the double filter capsule in such a way that in a filtration process the medium to be filtered flows in its flow direction from an upstream chamber in the housing through a first filter into an intermediate chamber between the first filter and a second filter and then through the second filter to an outlet. The housing can have an upstream-chamber access point for feeding a test fluid into the upstream chamber and an intermediate-chamber access point for feeding the test fluid into the intermediate chamber. Additional steps can include providing a connecting line between the upstream-chamber access point and the intermediate-chamber access point and determining the state (Continued)

of integrity of the double filter capsule on the basis of at least two test phases.

15 Claims, 6 Drawing Sheets

(58) Field of Classification Search
USPC .................................................... 73/38, 40
See application file for complete search history.

(56) References Cited

U.S. PATENT DOCUMENTS

| | | | | |
|---|---|---|---|---|
| 7,650,805 | B2* | 1/2010 | Nauseda | B01D 29/58 |
| | | | | 210/300 |
| 9,072,996 | B2* | 7/2015 | Jornitz | B01D 46/0086 |
| 10,656,046 | B2* | 5/2020 | Hunt | F16J 15/002 |
| 12,121,863 | B2* | 10/2024 | Friese | B01D 27/146 |
| 2007/0079649 | A1 | 4/2007 | Nauseda et al. | |
| 2013/0105411 | A1* | 5/2013 | Loser | B01D 29/41 |
| | | | | 210/323.1 |
| 2015/0316462 | A1 | 11/2015 | Helle et al. | |

\* cited by examiner

INTEGRITY TEST FOR A DOUBLE FILTER CAPSULE

CROSS REFERENCE TO RELATED APPLICATIONS

This is the U.S. National Stage of International Application No. PCT/EP2021/087327, filed Dec. 22, 2021, which in turn claims the benefit of European Patent Application No. 20 216 785.4, filed Dec. 23, 2020. The prior applications are incorporated herein by reference in their entirety.

The invention relates to checking the integrity, in particular the tightness or reliability of the retention capacity for substances to be filtered out, of an in particular sterile double filter capsule. The invention is used in particular in connection with a "pre-use-post-sterilization integrity test", i.e. before the use of a sterile double filter capsule in filtration processes, wherein the integrity or tightness or reliability of the retention capacity for substances to be filtered out of a filter capsule equipped with (at least) two integrated filters within a single or combined housing can be checked without compromising the sterility of the filter capsule or the structure in which the filter capsule is integrated for application.

In other words, the invention relates to an integrity test for a double assembly of (at least) two filters integrated in a common housing, with at least one filter preferably being a sterile filter. Here, the integrity test may correspond to a bubble point test, a diffusion test and/or a pressure hold test or at least resemble or include one or more such tests.

In pharmaceutical processes, for example in the production of antibodies or drugs, sterile filtration is used as a standard procedure. In many cases, this type of sterilization is the only sterilization option for novel biotechnologically produced active ingredients based on complex (bio)molecules, since other processes such as heating or exposure to gamma rays could damage, denature or destroy the molecules. In order to increase the safety of the sterilization but also to improve control over the process management, it is increasingly desirable to use at least two cascaded filter units either as redundant units or as mutually complementary units in a filtration assembly. In the case of single-use versions, e.g. two filter capsules connected by hoses are arranged one behind the other.

Figure 7:
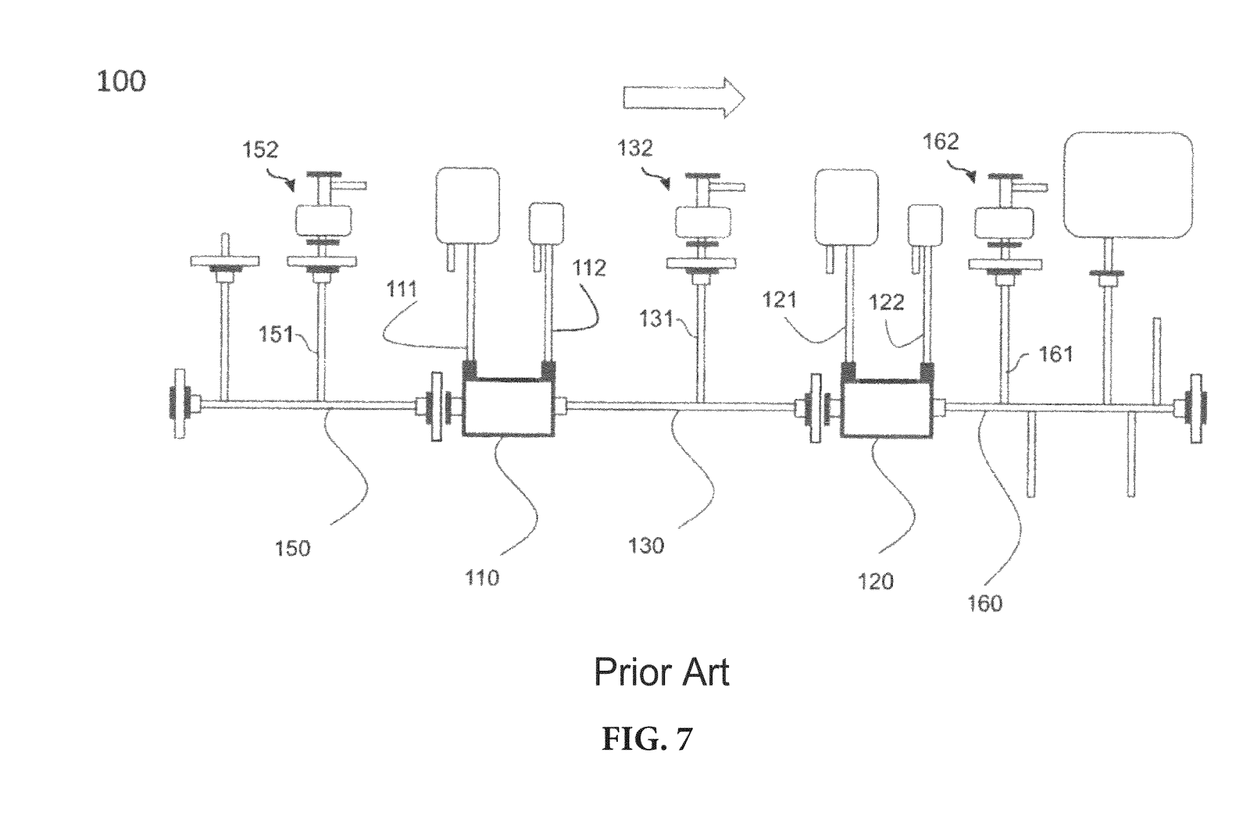
FIG. 7 shows an exemplary arrangement for an integrity check of a conventional double filter system.

In particular, FIG. 7 shows an exemplary arrangement of a conventional, complex double filter system 100. A first filter 110 is fluidly connected to a second filter 120 via a hose connection 130. The first filter 110 can be supplied with a medium to be filtered via a line 150 at the inlet. After filtering through the first filter 110, the medium can be supplied to the second filter 120 by means of the hose connection 130 and pass through it in order to then be discharged, in particular as a sterile medium, via a further line 160 downstream the outlet of the second filter 120. The general operational flow direction is indicated by an arrow. Additional connections or lines 111, 112 or 121, 122 can be provided on the first filter 110 and on the second filter 120, in particular for taking samples and/or as a connection for waste bags.

Each of the two filters 110, 120 can be individually checked for its integrity. In the case of the first filter 110, for example, a test connection 151 upstream of the filter 110 is suitable for this. In the case of the second filter 120, for example, a test connection 131 upstream of the filter 120 is suitable. To this end, the test connections 131, 151 can be connected to a corresponding test device via respective test fluid filters (e.g. air filters) 132, 152. A test fluid can be routed via the lines 151 or 131 into the first filter 110 and the second filter 120, respectively, and can be discharged via the lines (e.g. 132) downstream of the respective filter 110, 120. In this way, the integrity can be carried out separately for each of the two filters, for example by means of a diffusion test and/or bubble point test. However, these integrity tests are very expensive, especially if the sterility of the entire system has to be maintained at the same time. Above all, the large number of components required for the tests and their connections with different flow directions for the test fluid make the tests very critical for possible contamination.

It is therefore an object of the invention to check the integrity of a double filter assembly as simply and reliably as possible while at the same time ensuring sterility. This object is solved as indicated in the independent claims. Preferred embodiments are the subject matter of the dependent claims or otherwise also set out in the following description.

Thus, in one aspect, the invention relates to a method for conducting an integrity test of a double filter capsule. This method includes providing the double filter capsule with a housing in which (at least) a first filter for first filtering of a medium and (at least) a second filter for second filtering of the medium are arranged. The two (i.e. at least two) filters are arranged one after the other in the flow direction of the medium to be filtered such that during a filtration process the medium to be filtered flows in its flow direction from an antechamber in the housing through the first filter into an interspace between the first filter and the second filter and further flows or can flow through the second filter to an outlet provided in the housing, via which the filtered medium exits or can exit the double filter capsule. The housing has a (particularly closable) antechamber access for supplying a test fluid into the antechamber and a (particularly closable) interspace access for supplying the test fluid into the interspace.

In particular, membrane filters are used as the first and/or second filter. This means that the first or second filter preferably comprises a first or second filter membrane. Particularly preferably, the first and/or second filter is designed in the form of a substantially cylindrical filter candle. In a preferred embodiment, the medium to be filtered flows through the first and/or second filter membrane in a direction substantially radially inward during the filtration. The first and/or second filter membrane is particularly preferably folded into a pleated structure. In particular, in a cylindrical arrangement of the pleated structure, a large filter surface is combined with a comparatively high homogeneity of the flow, which increases the efficient use of the filter membrane. Otherwise, the first and/or second filter can alternatively be designed as a flat filter.

In addition, the method comprises providing a connecting line between the antechamber access and the interspace access for the (closable) fluidic connection of the antechamber with the interspace. Here, at least the fluidic connection to the interspace can be closed. To this end, either the interspace access itself or the connecting line can be closed accordingly, i.e. in particular can comprise a corresponding valve. When the fluidic connection between the antechamber and the interspace is established via the connecting line, the connecting line acts in particular as a bypass to the actual flow through the first filter. Preferably, however, the connecting line is only used for the integrity test, in particular in a second test phase, which will be described later, as a bypass and is fluidically connected to the interspace. Otherwise, in particular during filtration, the connecting line basically remains present (and connected), but the fluidic connection to the interspace is interrupted.

The method now comprises determining the state of integrity of the double filter capsule, in particular the first filter and the second filter and, if applicable, also the housing and/or possible seals between the filters and the housing, based on at least the following two test phases, namely a first test phase and a second test phase. However, it should be noted that the two test phases (with associated integrity checks) do not necessarily have to be carried out in the order in which they are named here. In particular, the second test phase can also take place before the first test phase. A compressible fluid, i.e. a gas, is preferably used as the test fluid.

For example, the first test phase thus comprises supplying the test fluid into the antechamber in particular via the antechamber access, when the fluidic connection of the connecting line to the interspace is closed (or interrupted) (and preferably when the outlet is open). In this state, a first integrity check is conducted. The first integrity check can in particular include a bubble point test and/or a diffusion test and/or a pressure hold test. Examples of the possible integrity checks will be described in more detail later. In any case, it is desirable in this first test phase to only introduce the test fluid into the antechamber via the antechamber access, but not to make the interspace directly accessible for the test fluid from the outside and to the outside. In the first test phase, the interspace could be fluidly connected to the environment (outside the housing) or the outlet of the double filter capsule in particular via the interspace access (e.g. by a three-way valve), for example for pressure equalization (e.g. by a sterile filter), but not to the connecting line for the test fluid. Rather, in this first test phase, only a passage of the test fluid through the first filter is provoked and its behavior is checked. Here, the test fluid that has passed through the first filter can now at least partially accumulate in the interspace and/or continue to reach the outlet of the double filter capsule via the second filter, wherein the outlet can also be closed or kept open depending on an operating mode of the first test phase to allow exit of the test fluid from the housing.

Thus, the first test phase can preferably be operated in two different test modes, which will be referred to below as a "stationary mode" and as a "dynamic mode". Here, in the stationary mode, a state is set in which as much test fluid is continuously supplied via the antechamber access as passes through the first filter and the second filter in order to exit via the outlet. A balance is thus set between the flow through the first filter into the interspace and the flow through the second filter out of the interspace. It can be assumed that in this state there is a constant pressure of the test fluid in the antechamber and in the interspace as well as at the outlet. The pressure differences (ideally also remaining constant over time in this mode) between the antechamber and the interspace on the one hand and the interspace and the outlet on the other hand lead to the respective flow of the test fluid through the first and second filters. With a given target characteristic of the double filter capsule (or the first and second filters) for the type of integrity check carried out, in particular in this test mode, a characteristic behavior can be expected with regard to the pressure in the antechamber (or a pressure difference between the antechamber and the outlet) on the one hand and the required inflow of test fluid into the antechamber to maintain the pressure in the antechamber (or the pressure difference between the antechamber and the outlet). If the actual characterization deviates from this expected behavior, it can be assumed that at least one of the two filter stages (i.e. in particular one of the two filters itself or their sealing to the housing or even the housing itself) is not intact. However, in this test mode it is usually not yet possible to determine immediately which of the two filter stages is possibly damaged. However, the combination with the second test phase allows conclusions to be drawn.

First, however, the dynamic mode used in the first test phase in a preferred embodiment should be described. Especially in this mode it is particularly advantageous to use a test gas as the test fluid, or at least the interspace should not be completely filled with an incompressible test fluid during the test or before the start of the test. The dynamic mode is based on the assumption or the operating state according to which an evaluation as part of the first integrity check takes place within such a short time (check time) after supply of the test fluid into the antechamber or after a pressure build-up of the test fluid in the antechamber such that this time (test time) is substantially shorter than the ratio of the (compressible) volume in the interspace and a target value of the volumetric flow rate of the test fluid through the first filter. "Substantially" shorter is to be understood here in particular as meaning that the check time is no longer than about 20%, preferably no longer than about 10%, even more preferably no longer than about 5%, most preferably no longer than about 2% of the quotient of the (compressible) volume in the interspace and the target value of the volumetric flow rate of the test fluid through the first filter. As far as the volumetric flow rate depends on the pressure in the antechamber or on the pressure difference between the antechamber and the interspace, the check time is preferably also adhered to as a function of the selected check pressure or the selected pressure difference.

As a result, the pressure in the interspace does not change substantially during the check time, largely independently of the state of the second filter. Thus, in this mode, the integrity state of the first filter stage (i.e. in particular of the first filter or its sealing toward the housing) can be determined in particular from the pressure in the antechamber (or a pressure difference between the antechamber and the interspace) and/or from the flow of the test fluid into the antechamber. The dynamic mode is thus based on a check in a non-equilibrium state of the system. However, it is preferably started from a known state of equilibrium. In other words, a state of equilibrium of the pressures and flows in the double filter capsule is preferably initially set before the pressure build-up in the antechamber for the first integrity test starts. In particular, a state with the same pressures in the antechamber, in the interspace and at the outlet can be considered as such a state of equilibrium, so that in this state there is substantially no flow through the filter.

The second test phase comprises a simultaneous supply of the test fluid into the antechamber (in particular via the antechamber access) and via the interspace access into the interspace (in particular when the outlet is open). The antechamber is fluidically connected to the interspace via the connecting line such that pressure equalization can take place between the antechamber and the interspace. In this state, a second integrity check is conducted. The second integrity check can in particular include a bubble point test and/or a diffusion test and/or a pressure hold test. The second integrity check preferably comprises the same test or tests as the first integrity check.

The connecting line used in the second test phase (as a bypass) between the antechamber and the interspace can also be/remain present during the first test phase, in which case only the fluidic connection to the interspace is interrupted. In other words, the entire structure with regard to the connected lines can remain intact during the integrity check and even during a subsequent (or even preceding) filtration.

In particular, it is not necessary to separate individual lines during the integrity test or between the integrity test and the filtration process and to reconnect them in different ways. The sterility of the entire system can thus be maintained in a particularly reliable manner.

The method according to the invention thus makes it possible to check at least two filters in a combination in a housing for their respective integrity in two substantially independent measurements such that, on the one hand, a reliable statement can be made about the integrity of each of the two filters individually, but also about the entire filter combination while on the other hand only a minimal intervention in the connection constellations provided and necessary for the pure filtration process is necessary in order to be able to carry out the integrity test. In particular, the integrity test according to the invention manages with a few additional connections and lines that have to be provided specifically for the integrity test, and the necessary switching processes, i.e. changes to the connections during the test, are kept to a minimum. This very effectively prevents contamination from being introduced into the filter system or being transferred within the filter system, for example due to (possibly inadvertently) changed flow directions within the test lines. Above all, the integrity test can be carried out with only one test fluid source (in particular an integrity test device), without connections having to be disconnected and reconnected (in a changed manner) between the test phases and without the need for a large number of valves having to be provided during the test or immediately before it and/or which would have to be actuated afterward. In particular, no complex conversion is required between the integrity test and the actual filtration process. Thus, the method according to the invention can be used very efficiently both immediately before a filtration process and immediately after a filtration process. Thus, the double filter capsule together with the test method according to the invention can be used for integrity testing very easily and safely before an actual filtration and/or after (factory-side) sterilization, i.e. in the pre-use-post-sterilization state, but also (especially immediately) after a filtration in order to validate if a filtrate is non-sterile due to a defective filter.

The method can be used in particular with a double filter capsule in which both filters are formed integrally. Here, both filters of the double filter capsule are installed within a common housing and, in particular, are firmly connected and/or welded to one another. Alternatively, components of the double filter capsule, for example the single filters, can be screwed and/or clamped together, so that both elements can be connected to one another by screwing and/or clamping. In particular, however, an integral design can prevent the filter system from becoming contaminated with impurities during assembly. Once a double filter capsule has been checked for integrity, it can be used for filtering with a high degree of reliability.

At least for most of the tests that are preferred in this context, particularly when using a test gas as the test fluid, it is at least preferred to wet the first filter and/or the second filter with a wetting medium directly or indirectly before determining the state of integrity of the double filter capsule. In particular, a liquid (e.g. a solvent) also contained in the medium to be filtered can serve as the wetting medium. Water or an aqueous solution is particularly preferably used for hydrophilic filter materials (e.g. membranes) and an alcohol or an alcohol/water mixture is particularly preferably used for hydrophobic filter materials (e.g. membranes).

As already mentioned, different types of integrity checks can be conducted in the individual test phases. Thus, the first and/or the second integrity check can in particular include a bubble point test and/or a diffusion test and/or a pressure hold test.

A bubble point test, such as can be carried out in particular as part of the first and/or second integrity check, is to be described in more detail below. In particular, it represents a preferred, non-destructive method of the integrity check carried out within the scope of the invention. In this test, the filter to be tested is first wetted with a wetting liquid. The bubble point test is carried out in particular with a test gas as the test fluid, with a pressure drop being built up across the first and/or second filter by the supply of test gas into the antechamber. In particular, in the case of the first test phase in dynamic mode, there is build up substantially a pressure drop across the first filter, in the case of the first test phase in the stationary mode there is build up substantially a pressure drop across the first and second filters, and in the case of the second test phase there is build up substantially a pressure drop across the second filter.

If the pressure drop at the respective filter is sufficiently low, the wetting medium is held in the pores of the respective filter, in particular by surface tension and capillary forces, such that a barrier is created for the test gas, which substantially cannot or at least not noticeably penetrate through the respective filter. A minimum pressure drop across the filter required to force the liquid wetting medium through the filter pores is a measure of the pore diameter according to $$\Delta P = \frac{4\sigma \cdot \cos\theta}{D} \qquad \text{(equation 1)}$$

$\Delta P$ corresponds to the bubble pressure (bubble point), i.e. the pressure drop across a filter from which the wetting medium, which has a surface tension $\sigma$ (e.g. water about 72.75 mN/m; 2-propanol about 21.7 mN/m), is pressed through pores having a pore diameter D by means of the test gas, and the test gas penetrates through the filter, in particular with visible bubble formation. $\Theta$ designates the wetting angle of the combination of wetting medium and membrane material used (e.g. CTA: 50°-55°; PAN: 52°-58°; PESU: 65°-70°, each for water as the wetting medium).

Preferably, the first and/or second integrity check is carried out on the basis of the bubble point test such that a bubble pressure is determined for the filter to be tested and this is compared with a corresponding target value (particularly specified by the manufacturer) for the bubble pressure. To this end, the pressure drop at the first or second filter is preferably set to, for example, about 80% of the specified desired value and then continuously increased under observation until bubble formation begins. If the measured bubble pressure is below the target value (in particular by more than an allowed tolerance), it can be concluded that the corresponding filter, in particular the filter membrane, is defective.

Since hardly any test gas penetrates through the first filter below the bubble pressure, the first test phase within the framework of the bubble point test is preferably carried out in the dynamic mode already described above. On the one hand, it is not necessary to wait for a stationary state to set in. Rather, a possible increase in pressure in the interspace occurs only so slowly that there is sufficient time to observe the incipient formation of bubbles on the first filter after the pressure in the antechamber has increased before the pressure in the interspace increases noticeably. On the other hand, an independent check of the two filters is directly possible, i.e. a statement about the integrity of the first filter can be made solely as a result of the first test phase.

In another preferred embodiment, the first and/or second integrity check includes a diffusion test. This test also represents a preferred, non-destructive method of the integrity check carried out within the scope of the invention. This test is based on the principle that in the case of a differential pressure (pressure drop across a filter), in particular below the bubble pressure, gas molecules of a test gas (e.g. air, nitrogen, argon, noble gas and/or other inert gas) diffuse through the filter wetted with the wetting medium according to Fick's law. The diffusion (flow) rate of the gas through a filter depends in particular about proportionally on the differential pressure and on the (effective) filter area of the filter. In other words, the diffusion test measures the transmembrane, diffusive gas flow ($1^{st}$ Fick's law) through a wetted filter material, e.g. a membrane. Gas diffusion can be measured in different ways. Such as the direct measurement of the gas volume on the clean side (filtrate side) or the amount of gas to be replenished on the inflow side (retentate side) in order to maintain the test pressure, or by determining the pressure increase on the clean side or the pressure drop after switching off the compressed gas or pressurized fluid source on the inflow side (pressure hold test). In other words, the pressure hold test is a special form of the diffusion test. In the pressure hold test, a very precise manometer is usually used in order to record in particular pressure changes on the inflow side due to gas diffusion through the filter. Since there is substantially no need to determine the gas flow on the clean side of the filter, the risk of contamination of the sterile side of the filter is avoided.

Preferably, the first and/or second integrity check is carried out on the basis of the diffusion test such that a target value (specified in particular by the manufacturer) is specified for the bubble pressure of the filter to be tested. The pressure drop across the first or second filter is then preferably set to, for example, a value in the range from about 60% to about 90% of the predetermined desired value for the bladder pressure. In particular, after a stabilization time to stabilize the diffusion rate, the gas flow or the diffusion rate is measured, for example over a measurement period in the range from about 5 s to about 120 s, preferably about 10 s to about one minute, for example about 20 s. This can be done by means a flow meter, for example. If the measured gas flow or the measured diffusion rate is outside (in particular above) a specification specified (in particular by the manufacturer), a defect in the corresponding filter, in particular the filter membrane, can be inferred.

In a preferred embodiment, in addition to the antechamber access for supplying a test fluid into the antechamber, the interspace access for supplying the test fluid into the interspace, and the outlet, the housing also comprises an inlet for supplying the medium to be filtered into the antechamber for the filtration process. In other words, in this case the housing has in particular two separate inlets or connections to the antechamber for supplying the medium to be filtered on the one hand and for supplying the test fluid on the other hand.

Alternatively, it would also be possible to provide only a single access to the antechamber in the housing of the double filter capsule, via which both the test fluid and the medium to be filtered are supplied to the antechamber—usually, however, not simultaneously but selectively. To this end, corresponding lines for the medium to be filtered and the test fluid can be brought together outside the housing and the individual supply lines can be closed separately from one another.

A closure of the closable antechamber and/or interspace access and/or the (preferably closable) inlet for supplying the medium to be filtered into the antechamber can expressly also be formed by a clampable element and/or a clamping element and/or a pinch valve. Such a clampable element, for example a hose or a portion of a hose, can be at least partially deformed, in particular by clamping, such that the passage or flow of a medium through this clampable element is reduced or even prevented. This can be done in a gradually adjustable manner, for example. Alternatively, the pinching can be done such that the flow is either substantially completely prevented or substantially completely permitted. An externally controllable clampable element makes it possible to control the inflow and/or the flow through a line element, such as a hose, without interfering with the interior space and possibly contaminating the medium therein.

Preferably, the membrane of the first filter has a pore size that is larger than a pore size of the membrane of the second filter. A first filter with a somewhat coarser pore size is designed to filter out larger suspended matter, such as lipid agglomerates or other particles from the medium, and thus to relieve the second filter, which is in particular intended to filter out cells. In this way it can be prevented that one of the filters becomes blocked prematurely or that too much suspended matter accumulates in the interspace.

Preferably, the pore size of the first filter has a value in the range from about 0.3 µm to about 0.6 µm. Alternatively or additionally, the pore size of the second filter preferably has a value in the range from about 0.1 µm to about 0.3 µm, in particular in the range from about 0.1 µm to about 0.2 µm. Preferably, at least the second filter is a sterile filter designed to filter the medium such that, as far as possible, all suspended matter that is larger than about 0.1 µm to about 0.2 µm is filtered out, in particular cells, bacteria, yeasts, fungal spores, germs and/or viruses. In particular, the first filter is designed to act as a pre-filter such that coarse particles or suspended matter are prevented from reaching the second filter, which is preferably a sterile filter, and from "blocking" or clogging it. The system of the double filter capsule is preferably designed such that the sterile filter can only filter out bacteria or protozoa and/or viruses from the medium.

Alternatively, the pore size of the first filter roughly corresponds to the pore size of the second filter. If the pores of both filters are about the same size, the second filter can serve as a redundant filter in the event that the first filter is damaged in operation. Redundant sterile filtration means that from a validation perspective, a single filter is sufficient for sterilization filtration. For example, an additional second sterile filter, specifically a 0.2 µm filter (called a "secondary filter" but sometimes also called a "police filter" or "redundant filter") is used for safety reasons, and the filter closest to the fill point, is the first filter (primary filter). Particularly when the pore sizes of the first and second filters are identical or at least similar, the pore size of the membranes of the first filter and the second filter preferably has a value in the range from about 0.05 µm to about 0.4 µm, in particular in the range of about 0.1 µm to about 0.2 µm.

In the event that the first filter fails the integrity test after use, the second filter (secondary filter) will be tested and if it passes the integrity test, the filtered media need not necessarily be discarded as the filtration process substantially took place via the secondary filter. In such a scenario, both filters should be tested based on the EU-GMP requirement for PUPSIT (Pre-Use-Post-Sterilization Integrity Test) before use and after sterilization. Otherwise, the secondary filter might not be considered to be a valid sterilization filter after use. After filtration using such a double filter capsule, it is at first sufficient to test the primary filter. Only if the primary filter does not pass the integrity test after use should the secondary filter also be tested after use.

Preferably, at least one filter is designed in the form of a substantially cylindrical filter candle. Such a cylindrical filter candle having a height that is in particular greater than the diameter of the cylindrical candle has the advantage that a particularly large area is created for the pleated structure, so that the largest possible amount of a medium can be filtered as effectively as possible. A filter membrane in a pleated structure is arranged substantially in the shape of a cylinder within the filter candle. The height of the cylindrical filter candle can be referred to as the cylinder height.

A filter candle is therefore a preferred filter. For example, a core (perforated inner tube) and an outer tube (backflow preventer) concentrically surrounding the core are provided such that an annular gap is formed between the core and the outer tube (shell), in which a preferably pleated filter membrane is arranged in folds, the folds of which extend from their respective fold edges resting against the outer tube in the direction of the inner tube to their respective fold tip or are arranged along the circumference of the annular gap. In particular, the core represents a part of the housing of a filter candle and serves as a support.

Alternatively, the filter can also only have a substantially flat filter element, for example a flat filter or a lamina with pores, which is arranged between two spaces above an opening. In this case, however, the filter area is comparatively small.

According to a further aspect, the invention relates to a system for conducting an integrity test, comprising:

a double filter capsule with a housing in which a first filter and a second filter are arranged one after the other in the flow direction of a medium to be filtered such that during a filtration process the medium to be filtered flows in its flow direction from an antechamber in the housing through the first filter into an interspace between the first filter and the second filter and onward through the second filter to an outlet, the housing having an antechamber access for supplying a test fluid into the antechamber and an interspace access for supplying the test fluid into the interspace;

a connecting line between the antechamber access and the interspace access for fluidic connection between the antechamber and the interspace, wherein at least the fluidic connection to the interspace can be closable; and an integrity check device designed to conduct the following two test phases and, based thereon, to determine an integrity state of the double filter capsule:

a first test phase, comprising: supplying the test fluid into the antechamber with the fluidic connection of the connecting line to the interspace closed and carrying out a first integrity check; and a second test phase, comprising: simultaneously supplying the test fluid into the antechamber and via the interspace access into the interspace, the antechamber being fluidically connected to the interspace via the connecting line such that pressure equalization takes place between the antechamber and the interspace, and carrying out a second integrity check.

The integrity check device is designed in particular to carry out at least the first test phase and/or the second test phase in an at least partially automated manner. In particular, valves can be controlled automatically, i.e. opened and/or closed automatically or controlled by a computer, and in particular a pressure can be applied and adjusted automatically. In addition, a diffusion rate can preferably be determined automatically and/or a bubble point test can be carried out and the associated bubble point can be determined. For example, a pressure can also be increased slowly at an inlet and thereby determined up to the point in time at which the applied compressed air passes through one or both filters and a predetermined diffusion value is reached. Such a pressure can then correspond to the bubble point. Preferably, the interior of the double filter capsule can be at least partially aerated and/or deaerated by means of the integrity check device, in particular via access to the antechamber and/or interspace.

The system preferably comprises at least one test fluid filter, which is preferably designed as a sterile filter for filtering the test fluid before the test fluid enters the antechamber or interspace via the antechamber access or the interspace access. Depending on the field of application, it is necessary or desirable for the pressurized fluid, for example compressed air, to be sterile before it is introduced into the double filter capsule. A sterile filter for filtering the pressure fluid can prevent contamination from getting into the interior of the double filter capsule, in particular between the two filters, along with the pressure fluid. This ensures that the sterile conditions within the double filter capsule are maintained even during the integrity check.

According to a further aspect, a computer program product includes instructions that, when the program is executed by a computing unit, in particular an integrity check device, cause the latter to at least partially carry out the method or the steps of said method.

Embodiments and examples will be explained below with reference to drawings. Features described therein may be considered optional and/or combinable with other features, unless they are mutually exclusive.

Figure 1:
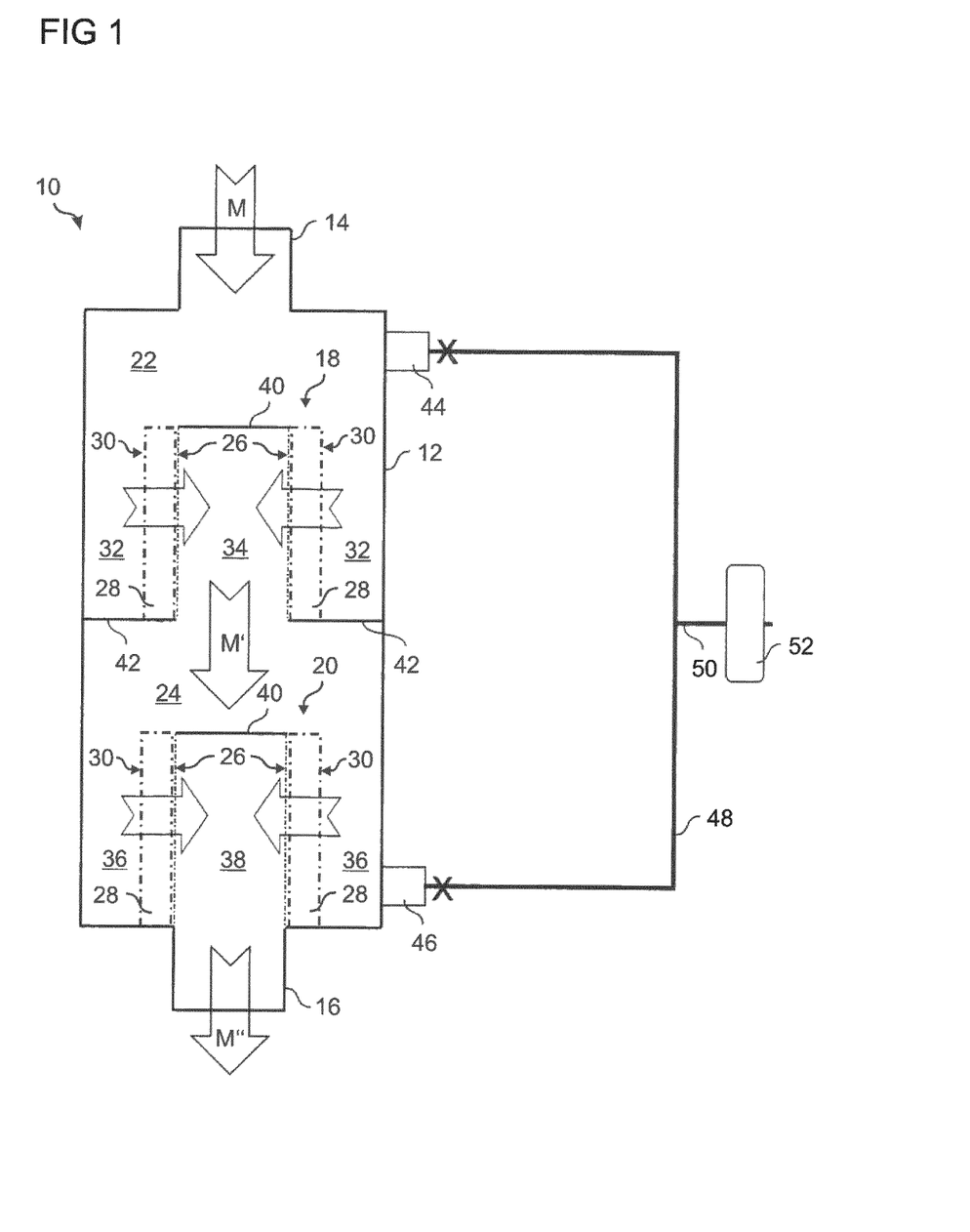
FIG. 1 is a schematic cross-sectional view of an exemplary integrity check setup for a double filter capsule.

FIG. 1 shows an exemplary schematic cross-sectional view of a double filter capsule 10. The double filter capsule 10 comprises a preferably substantially cylindrical housing 12, in which in this variant an inlet 14 for supplying a medium M to be filtered and an outlet 16 are provided, via which a filtered medium M" (i.e. the medium M after filtration has taken place) can be discharged. A first filter 18 and a second filter 20 are arranged one after the other within the housing 12 in the flow direction of the medium from the inlet 14 to the outlet 16.

Within the housing 12, the first filter 18 separates (fluidically) an antechamber 22 from an interspace 24. The interspace 24 is in turn separated (fluidically) from the outlet 16 by the second filter 20 (in the sense that at least in regular filter operation with an intact filter capsule any fluid flow between the interspace 24 and the outlet 16 must pass across/through the filter 20 and is thus filtered). During a filtration process, the medium M to be filtered thus enters the antechamber via the inlet 14. In a first one of two filter steps that are sequential in the flow direction, the medium M to be filtered passes from the antechamber 22 through the first filter 18 into the interspace 24 and is thus at least pre-filtered or partially filtered. The at least partially filtered medium M' then passes through the second filter 20 from the interspace 24 to the outlet 16 and there exits the housing 12 as the filtered medium M".

In the variant shown, the first filter 18 and the second filter 20 are each designed as a filter candle. As far as such filter candles are substantially constructed analogously, the following description does not distinguish between the first and the second filter, even if they can differ and are intended to differ, for example with regard to their pore size, depending on the specific application.

A filter candle preferably comprises a core 26, in particular as a cylindrical support structure, which has a plurality of holes, preferably arranged in a grid-like manner, and/or is formed as a lattice structure. For example, the core 26 can be formed as a perforated cylindrical tube and/or a cylindrical grid. In particular, the core 26 can thus be flown through by fluids, in particular the medium M and a test fluid that will be described later, substantially without any noticeable flow resistance.

A filter structure 28, preferably folded like a pleat, is arranged around this support structure (core 26). The filter structure 28 preferably comprises at least one filter membrane and particularly preferably at least one nonwoven layer on or in which the filter membrane is arranged. In a preferred embodiment, the filter membrane is embedded between two nonwoven layers. More preferably, a sequence of layers with a plurality of filter membranes can also be provided, each of which is embedded between nonwoven layers.

Preferably, the filter candle also comprises an outer tube 30, which surrounds the filter structure 28 and the core 26 and serves in particular as a backflow preventer 30 to prevent possible damage to the filter structure 28 in the event of a backward pressure build-up (i.e. against the actual flow direction) in the filter candle. The core 26 and/or the backflow preventer 30 are formed in particular from a plastic which is suitable for being sterilized. For example, polypropylene and/or polytetrafluoroethylene and/or another polymer is suitable as a construction material, at least for parts of the double filter capsule such as the core 26 and/or the backflow preventer 30. Alternatively or in addition, the core 26 and/or the backflow preventer 30 and/or the housing also comprise metal.

In a double filter capsule, as is preferably used within the scope of the present invention, with filter candles of the type described as the first filter 18 and/or second filter 20, the regular flow direction during filtration through the filter candle(s) preferably extends substantially radially inward, such as is shown in FIG. 1. The antechamber 22 thus preferably also extends in an area radially outside the first filter candle (first exterior space 32). The interspace 24 in turn extends both in an area radially inside the first filter candle (first interior space 34) and in an area radially outside the second filter candle (second exterior space 36). An area radially inside the second filter candle (second interior space 38) is then connected directly to the outlet 16. In order to seal off the first interior space 34 from the antechamber 22 or to seal the second interior space 38 from the interspace 24, the two filter candles each have a base cap 40 as an end wall. In order to seal off the first outer space 32 from the interspace 24, an intermediate wall 42 connecting the first filter candle to an outer wall of the housing 12 is provided. In principle, it is possible with the structure shown in FIG. 1 to construct the entire filter capsule in a modular manner such that not only two, but also three or more filters are arranged one behind the other in the manner shown.

As is also shown in FIG. 1, the double filter capsule 10 comprises an antechamber access 44 and an interspace access 46, via which the antechamber 22 and the interspace 24 can be fluidically connected or are connected by means of a connecting line 48. The antechamber access 44 and the interspace access 46 are used to supply a test fluid, in particular a test gas, to the antechamber 22 or the interspace 24. Preferably, the fluidic connection of connecting line 48 to both the antechamber 22 and the interspace 24 can be closed selectively—specifically without separating the mechanical connection of the connecting line 48 via the antechamber access 44 to the antechamber 22 or via the interspace access 46 to the interspace 24, i.e. without the once-closed fluid channel being opened along the connecting line and the accesses to the interior of the housing 12. The fluid flow can thus be selectively interrupted or controlled without compromising the sterility of the system.

This can be realized in particular by a respective valve (antechamber access valve or intermediate chamber valve). As such valves, clampable tube elements or clamping elements or pinch valves are conceivable. To this end, in particular, the connecting line 48 itself can be designed as a clampable or squeezable hose connection or at least comprise clampable/squeezable hose portions to the antechamber access 44 or to the interspace access 46. The fluidic connection of the connecting line 48 to both the antechamber 22 and the interspace 24 is preferably closed during a filtration process. This is represented by the "X" in FIG. 1.

In order to supply the test fluid for the integrity check(s) to the double filter capsule 10, the connecting line 48 preferably has a connection to a test device line 50, in which a test fluid filter 52 (in particular as a sterile filter) is provided and which leads to an integrity check device (not explicitly shown). The test fluid can optionally be supplied to the antechamber 22 and/or to the interspace 24 via this fluid connection. In particular, the test fluid pressure and/or a test fluid volumetric flow rate can preferably also be measured and/or adjusted in this way. The Sartocheck® 5 device from Sartorius, for example, can be used as an integrity check device.

Before the integrity state of the double filter capsule 10 is determined, it is preferably ensured that the two filters are wetted. Either this is already guaranteed by the fact that a filtration process has already taken place before the integrity state is determined. Or, a wetting liquid is preferably introduced analogously to the filtration process, in particular also via the inlet 14 in the manner shown in FIG. 1, in order to wet the filter structures.

Figure 2:
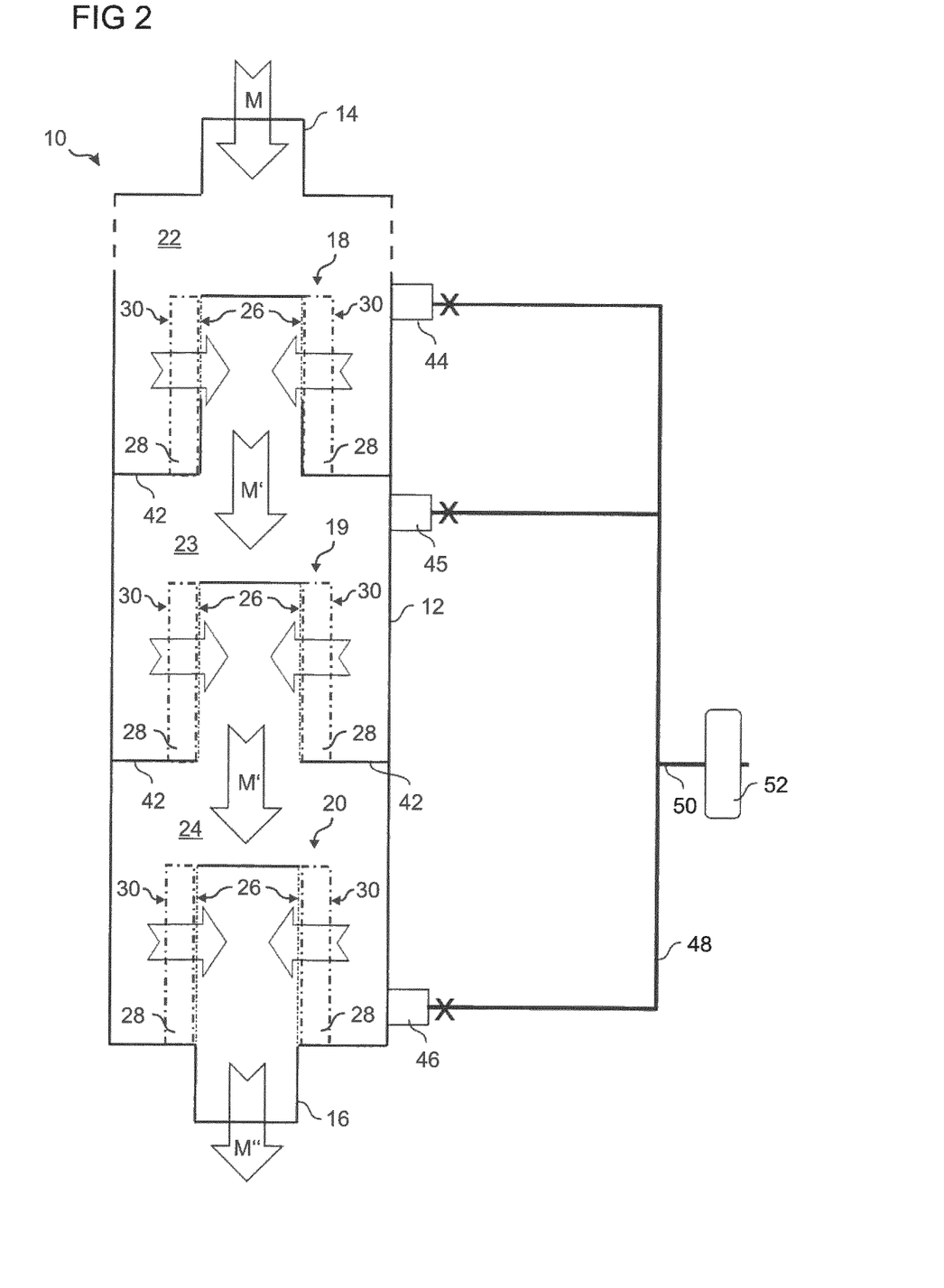
FIG. 2 is a schematic cross-sectional view of an example integrity check setup of a double filter capsule equipped with more than two filters.

FIG. 2 shows an exemplary schematic cross-sectional view of a further double filter capsule 10, which in this embodiment even comprises more than two filters. Three filters are shown explicitly in FIG. 2. In principle, however, more filters could also be accommodated in the same, preferably substantially cylindrical, housing 12. The explanations regarding the double filter capsule 10 of FIG. 1 can also be applied to the double filter capsule 10 of FIG. 2, so that a precise description of analogous components (in particular if they are provided with the same reference numerals) no longer has to be repeated. Thus, within the housing 12 in the flow direction of the medium from the inlet 14 to the outlet 16 there are arranged a first filter 18, an intermediate filter 19, and a second filter 20 one after the other. Here, the invention can be used selectively on at least two of the three or more filters, in particular selectively on at least two filters immediately consecutive in the flow direction of the medium. Preferably, however, all (e.g. three or more) filters are checked for integrity with the aid of a method according to the invention, as will be described in more detail later.

Inside the housing 12, the first filter 18 separates the antechamber 22 (fluidically) from a (first) interspace 23. The (first) interspace 23 in turn is separated by the intermediate filter 19 from a (second) interspace 24, which in turn is separated (fluidically) from the outlet 16 by the second filter 20 (in the sense that any fluid flow between the inlet 14 and the outlet 16 must pass across/through the respective filters 18, 19, 20 and is thus filtered during regular filter operation with a completely intact filter capsule). During a filtration process, the medium M to be filtered thus enters the antechamber 22 directly or indirectly via the inlet 14. In a first one of at least three sequential filter steps in the flow direction, the medium M to be filtered passes from the antechamber 22 through the first filter 18 into the (first) interspace 23 and is thus at least prefiltered or partially filtered. The at least partially filtered medium M' then passes through the intermediate filter 19 from the (first) interspace 23 into the (second) interspace 24 and is thus further filtered. Finally, the further filtered medium M' passes through the second filter 20 from the (second) interspace 24 to the outlet 16 and there exits the housing 12 as a filtered medium M".

In the variant shown, the at least three filters are each designed as a filter candle, as has already been described in connection with FIG. 1. Analogously to the embodiment of FIG. 1, the embodiment of FIG. 2 also comprises an antechamber access 44 and a (second) interspace access 46 and in this case additionally at least one (first) interspace access 45, via which the antechamber 22, the (second) interspace 24 or the (first) interspace can be or are connected fluidically by means of a connecting line 48. The antechamber access 44 and the interspace accesses 45, 46 serve to supply a test fluid, in particular a test gas, into the antechamber 22 or the interspaces 23, 24. The fluidic connection of the connecting line 48 is preferably both to the antechamber 22 and to the interspaces 23, 24—without separating the mechanical connection of the connecting line 48 via the antechamber access 44 to the antechamber 22 or via the interspace accesses 45, 46 to the interspace 23 or 24, i.e. without the once-closed fluid channel along the connecting line and the accesses to the interior of the housing 12 being opened. The fluid flow can thus be selectively interrupted or controlled without compromising the sterility of the system. This can be implemented in particular by a respective valve, as has already been described by way of example in connection with FIG. 1.

Otherwise, preferably all the explanations relating to the first and second filters of FIG. 1 can be applied directly or indirectly to the combination of the first filter 18 and the intermediate filter 19, which is then comparable with a second filter of FIG. 1 (with the intermediate space 23 in between), or to the combination of the intermediate filter 19, which is then comparable with a first filter of FIG. 1, the antechamber 23, and the second filter 20.

Figure 3A:
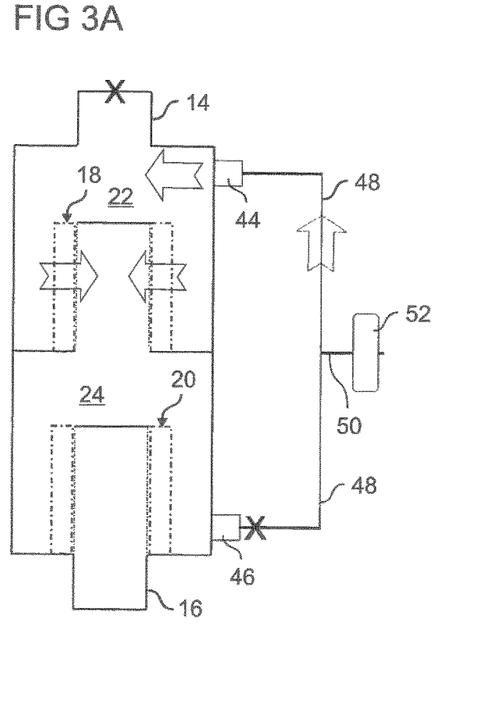
FIG. 3A is a schematic diagram of the setup of FIG. 1 for illustrating an example first test phase in a dynamic mode.
Figure 3B:
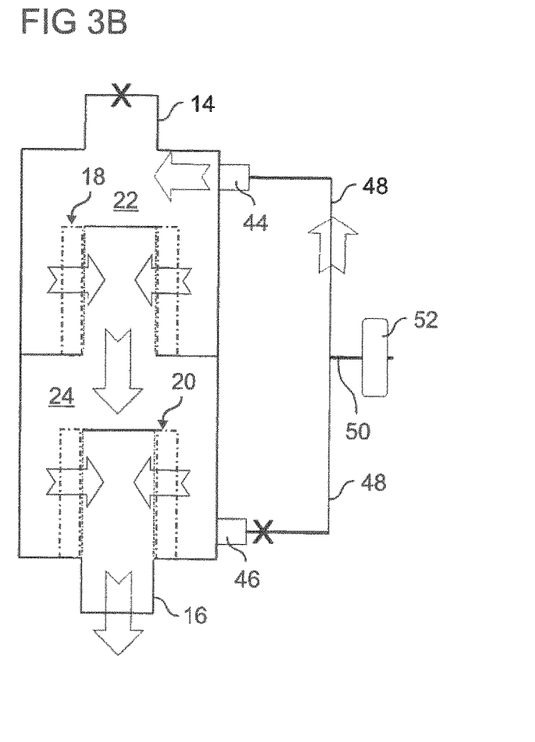
FIG. 3B is a schematic diagram of the setup of FIG. 1 for illustrating an exemplary first test phase in a stationary mode.

An exemplary determination of the integrity state of the double filter capsule 10 based on at least two test phases will be described below with reference to FIGS. 3A, 3B and 4. FIGS. 3A and 3B illustrate in particular a first test phase, with FIG. 3A showing a first integrity check in a dynamic mode and FIG. 3B showing a first integrity check in a stationary mode. Finally, FIG. 4 illustrates a second test phase.

Thus, in the preferred first test phase illustrated in FIG. 3A, at least the fluidic connection of the connecting line 48 to the interspace 24 is closed in addition to the inlet 14. This is represented by the "X" in the area of the interspace access 46 in FIG. 3A. Now, a test gas is supplied into the antechamber 22 via the antechamber access 44 by means of the connecting line 48 fluidically connected to the antechamber 22. This builds up a pressure difference between the antechamber 22 and the interspace 24, which leads to the test gas partially penetrating the first filter 18. The gas flow is represented by arrows. In this way, a first integrity check is carried out, for example in the form of a bubble point test and/or a diffusion test and/or a pressure hold test. Depending on the test method, the pressure in the antechamber 22 is measured and/or regulated and/or a gas flow of the test gas into the antechamber 22 is measured and/or regulated. The integrity of the first filter 18 can be inferred from the respective measurement or control variables, in particular in the test-specific manner already described. In particular, in the embodiment illustrated in FIG. 2A, this test is conducted in a dynamic mode. The integrity check is carried out so briefly or quickly that during the test the pressure in the interspace 24 hardly changes due to the gas flow through the first filter 18.

An alternative variant, in which the first test phase is carried out in a stationary mode, is shown schematically in FIG. 3B. While in the dynamic mode it is usually not decisive whether the output 16 is open or closed during the first integrity check, the output 16 should be open in the stationary mode. In particular, in the stationary mode, the goal is to establish a continuous gas flow from the connecting line 48 via the antechamber access 44 into the antechamber 22, through the first filter 18, into the interspace 24 and through the second filter 20 to the outlet 16. In this stationary fluidic series connection, the pressure drops across the two filters are a direct measure of their fluidic resistances, and the measurements of the total pressure and/or flow can be used to draw conclusions about the series connection of the two filters, in particular whether they meet the specified specifications with regard to bubble pressure, diffusion and/or pressure holding values. Depending on the test procedure, however, only one statement about the combination of the two filters is usually possible. A deviation from the specification does not necessarily allow a conclusion as to which of the two filters does not or less correspond to the specifications. However, such a statement can at least be substantiated in combination with the second test phase.

Figure 4:
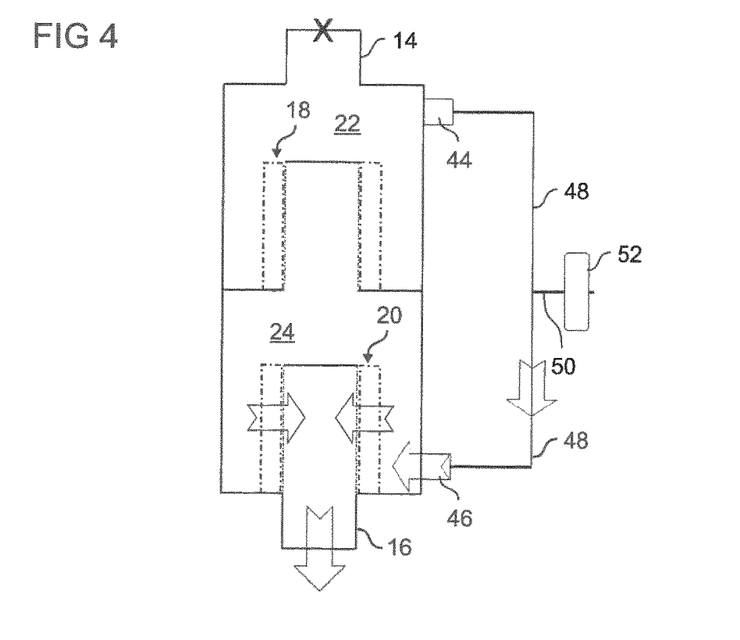
FIG. 4 is a schematic diagram of the setup of FIG. 1 for illustrating an exemplary second test phase.

Finally, FIG. 4 illustrates an exemplary implementation of a second test phase. In this test phase, the antechamber 22 and the interspace 24 are connected via the connecting line 48 such that the supplied test gas flows into both the antechamber 22 and the interspace 24 at substantially the same pressure. The connecting line 48 thus brings about a pressure equalization between the antechamber 22 and the interspace 24. Regardless of the type of integrity test carried out and in particular regardless of a test pressure applied via the second filter 20, it is ensured that the first filter 18 is not damaged by an inverse pressure on the one hand. On the other hand, it is ensured that a test gas introduced into the interspace 24 does not diffuse out through the first filter 18 (as backward), but can only flow through the second filter 20 to the outlet 16. The corresponding gas flow of the test gas in this second test phase is illustrated in FIG. 4 by arrows. This ensures that any values of pressure and/or gas flow measured or controlled for the second integrity check only represent the characteristics of the second filter 20. Even a strong deviation of the first filter 18 from the required specifications would not falsify the evaluation of the second filter 20 in the second test phase.

These test phases described with reference to FIGS. 3A, 3B and 4 can also be applied to a double filter capsule as shown in FIG. 2, where the two test phases can be used to e.g. test the combination of the first filter 18 and the intermediate filter 19 (as the second filter) and/or the combination of the intermediate filter 19 (as the first filter) and the second filter 20. Another option for testing all three filters using an additional test phase will be described later.

FIGS. 5A to 5E show an exemplary sequence of method steps for illustrating how an integrity test can be embedded in a filtration process. The arrows indicate the flow direction of the respective fluids and the markings "X" represent correspondingly closed valves or lines.

Figure 5A:
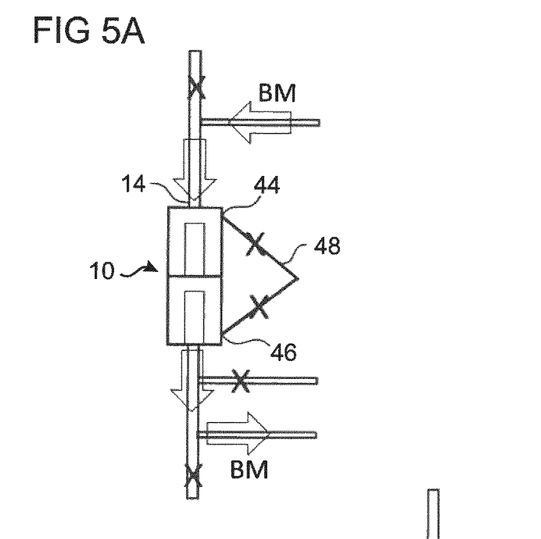
FIGS. 5A-E schematically show various states during a course of a filtration process (including the preparations and implementation of an integrity test) for illustrating the possible inclusion of an integrity test.

For example, FIG. 5A illustrates a wetting step for wetting the filter structures in the double filter capsule using a wetting medium BM. In this wetting step, the fluidic connections are preferably closed via the antechamber access and the interspace access. Furthermore, an inflow for the medium to be filtered is temporarily closed. The wetting medium BM flows through both filters and, after exiting the double filter capsule, is discharged via the outlet, preferably by means of a separate drain. The wetting medium can thus be disposed of separately.

Figure 5B:
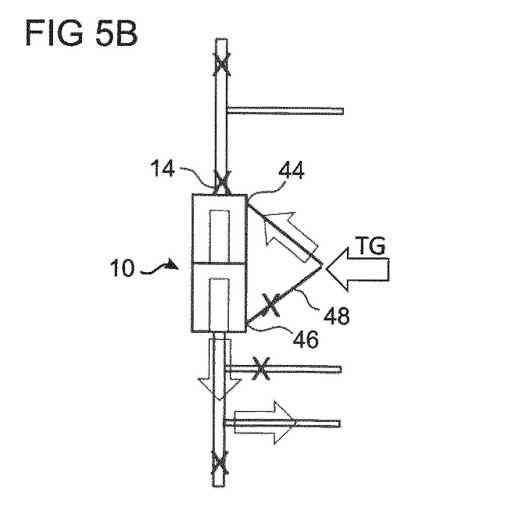

FIG. 5B schematically shows a state in a subsequent first test phase as has already been described, for example, with reference to FIG. 3A (or FIG. 3B). In particular, the inlet and the interspace access are closed, while the antechamber access is open. Test gas is supplied into the antechamber via the antechamber access and the first integrity check is carried out.

Figure 5C:
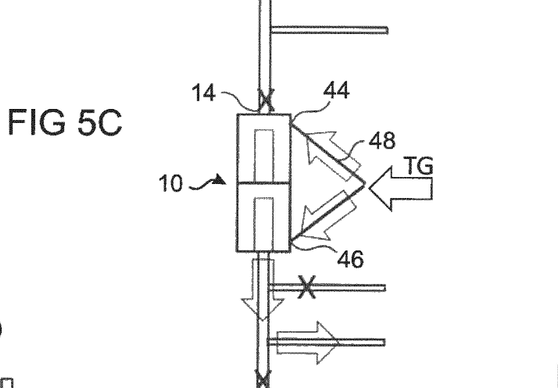

FIG. 5C schematically shows a state in a second test phase as has already been described, for example, with reference to FIG. 4. Even if this second test phase is shown here after the first test phase, the two test phases can also be carried out in reverse order. The inlet in particular is closed, whereas unlike in the first test phase, both the antechamber access and the interspace access are open. The outlet is also open in this case. Here, test gas is introduced both into the antechamber and into the interspace. There is no net flow of test gas through the first filter due to the matching pressure in the antechamber and in the interspace. Any observed gas flow of the test gas is due to flow through the second filter.

Figure 5D:
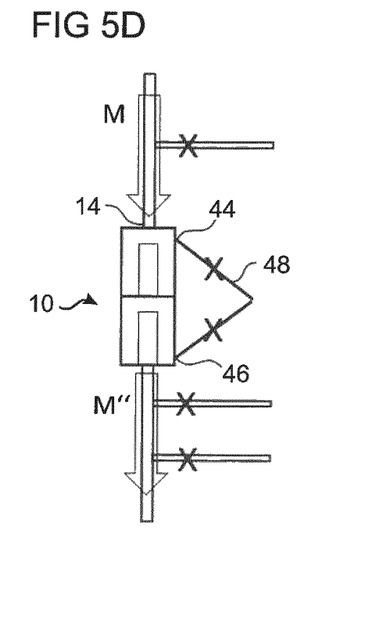

If both filters pass the integrity test, the double filter capsule can be used for filtration, as is shown schematically in FIG. 5D. The medium M to be filtered flows through both filters via the inlet into the double filter capsule and exits the outlet as filtered medium M". The medium to be filtered is preferably supplied via a separate access. In this case, the access, which was previously opened for supplying the wetting medium, is preferably closed. The separate drain for the wetting medium is also closed. To this end, a drain for the filtered medium is open. The antechamber access and the interspace access are preferably closed as well.

Figure 5E:
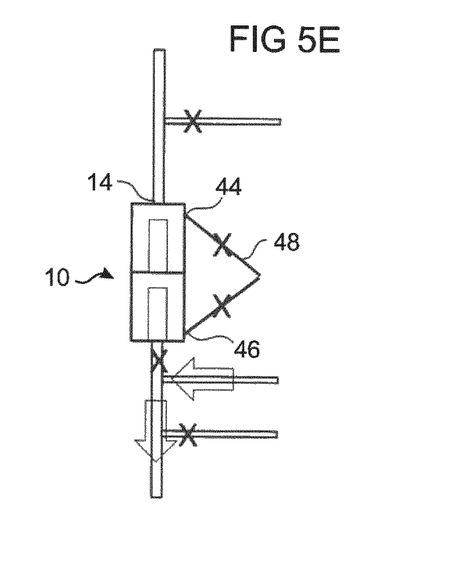

After completion of the filtration process, the residual liquid is preferably pressed out of the lines, as shown in FIG. 5E. By opening a further access behind the outlet of the double filter capsule and closing the outlet, the tube system can be emptied downstream of the outlet, for example by introducing compressed air. As an alternative or in addition to the integrity test prior to the filtration process, it is also possible to carry out an integrity test after the filtration process.

FIGS. 6A to 6F show a further exemplary sequence of method steps for illustrating how an integrity test can be embedded in a filtration process, the double filter capsule here being equipped with a further filter stage. In this embodiment (e.g. according to FIG. 2), the double filter capsule can even be used as a triple filter capsule. However, since at least two filter stages continue to work one after the other, it is still understood here as an embodiment of a double filter capsule.

Figure 6A:
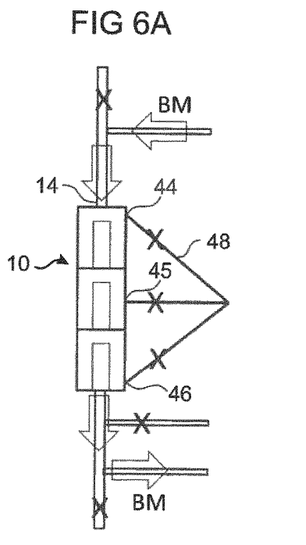
FIGS. 6A-F schematically show various states during the course of a filtration process (including the preparations and implementation of an integrity test) for further illustrating the possible inclusion of an integrity test.

For example, FIG. 6A illustrates a wetting step for wetting the filter structures in the double filter capsule using a wetting medium BM. In this wetting step, the fluidic connections via the antechamber access 44 and the interspace accesses 45, 46 are preferably closed. Furthermore, an inflow for the medium to be filtered is preferably closed. The wetting medium BM flows through all (at least three) filters and, after exiting the double filter capsule, is discharged via the outlet, preferably by means of a separate drain. The wetting medium can thus be disposed of separately.

Figures 6B, 6C:
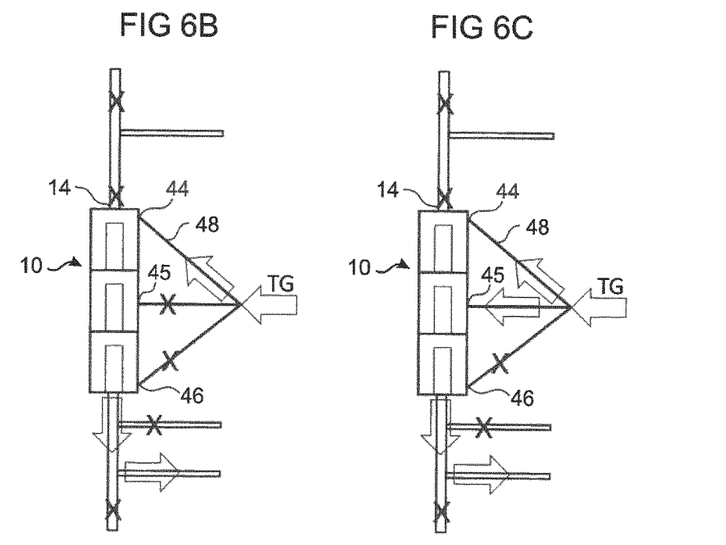

FIG. 6B schematically shows a state in a subsequent first test phase as has already been described, for example, with reference to FIG. 3A (or FIG. 3B). In this case, in particular, the inlet 14 and the interspace accesses are closed, while the antechamber access 44 is open. Test gas is introduced into the antechamber via the antechamber access 44 and the first integrity check is carried out.

FIG. 6C schematically shows a state in a second test phase. In this case, in particular the inlet 14 is closed, while, unlike in the first test phase, both the antechamber access 44 and the first interspace access 45 are open. The outlet is also open in this case. Here, test gas is introduced both into the antechamber and into the first interspace. There is no net flow of test gas through the first filter due to the matching pressure in the antechamber and in the first interspace. Any observed gas flow of the test gas can be contributed to a flow through the second filter.

Figures 6D, 6E:
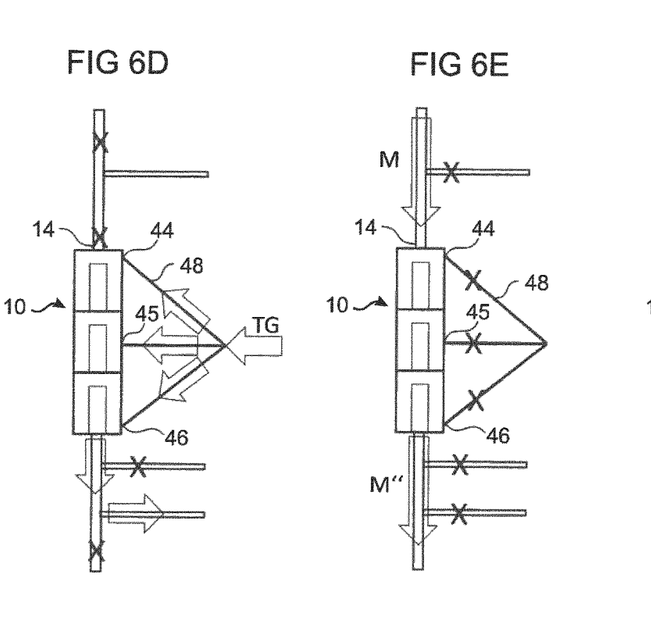

FIG. 6D schematically shows a state in a third test phase similar to the test phase already described with reference to FIG. 3. In particular, the inlet 14 is closed, while both the antechamber access 44 and both interspace accesses 45, 46 are open. The outlet is also open in this case. Here, test gas is introduced both into the antechamber and into the interspaces. There is no net flow of test gas through the first and second filters due to the matching pressure in the antechamber and in the interspaces. Any observed gas flow of the test gas can be contributed to a flow through the third filter. The three test phases do not have to be carried out in the order described, but can also be carried out in different orders.

Figure 6F:
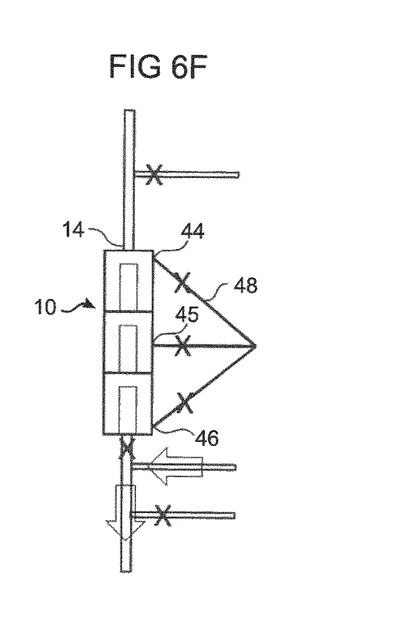

If all three filters pass the integrity test, the double filter capsule (in this case even with three filters) can be used for filtration, as is shown schematically in FIG. 6E. The medium M to be filtered flows into the double filter capsule through all three filters via the inlet and exits the outlet as a filtered medium M". After completion of the filtration process, the residual liquid is preferably pushed out of the lines, as shown in FIG. 6F.

The integrity check device can in particular be designed to control, monitor or execute all or individual steps of the method in an at least partially automated manner. In particular, for example, valves, pumps, bypass and/or line openings and closures, gas and/or liquid pressure, temperature elements, displays and/or warning lights or warning signals can be controlled by the integrity check device.

The exemplary proof-of-principle measurements listed below show that the integrity test of a double filter capsule according to the invention delivers identical results to an integrity test of two identical but mutually isolated filters. The proof-of-principle measurements are based on the method according to the invention in order to demonstrate its feasibility and reliability. In particular, these proof-of-principle measurements are based on diffusion tests and bubble point tests. Filters that are present in a double filter capsule are compared with filters that are identical to these filters and that are tested in an isolated manner. In other words, these are results from filter candles that are not installed in a double filter capsule and that are the same filter candles that are present in a double filter capsule and that were tested using the integrity test according to the invention. Combinations of different models of filters used to demonstrate the feasibility and effectiveness of the integration test according to the invention are described by way of example. In a filter housing of the following examples, always two filter candles that are "connected in series" are installed.

Common models of filters are tested, wherein the models are designated as "BH1" and "BH9". The designations refer to the so-called overall height, i.e. substantially the cylinder length of the filter candle. The built-up test elements of the filter candles may have a combination of the filter sizes BH9/BH9 or BH1/BH1. A characteristic size for the filter model with the designation BH9 is the filter area of about 0.18 m². A characteristic size for the filter model with the designation BH1 is the filter area of about 0.55 m2. Furthermore, the designations are used throughout to refer to the characteristic filter area.

The following models in a double filter capsule can be examples of structures that have been tested:

| First filter | Second filter |
| --- | --- |
| Sartopore 2, 0.2 μm BH9 | +Sartopore 2, 0.2 μm BH9 |
| Sartopore 2, 0.2 μm BH1 | +Sartopore 2, 0.2 μm BH1 |

The term "Sartopore" refers to an exemplary filter type, whereas the specification "0.2 μm" refers to the pore size of the membrane. Both the diffusion rate and the bubble pressure (bubble point) depend on various parameters, such as the temperature, which usually corresponds to room temperature during measurements, and the solvent used in the integrity test. The diffusion also depends on the overall height of the filter candle and thus the filter area.

a) First Test Setup:

The following limit values are available: for Sartopore 2, pore size 0.2 μm, test pressure 2.5 bar:

| BH9 | Diffusion rate: | <7 ml/min |
| --- | --- | --- |
|  | Bubble point: | >3.2 bar |
| BH1 | Diffusion rate: | <18 ml/min |
|  | Bubble point: | > 32 bar |

First Example of a Double Filter Capsule:

Two filters, each with a filter area of around 0.18 m², are tested for integrity.
First filter: Sartopore 2, pore size 0.2 μm, BH9;
Second filter: Sartopore 2, pore size 0.2 μm, BH9.

Thus, in this proof-of-principle test, two identical filters are installed in one housing and their integrity test is compared with two integrity tests of the respective individual identical filters in order to demonstrate the feasibility and effectiveness of the integrity test according to the invention.

| | Assembly | Measured diffusion rate | Bubble point |
| --- | --- | --- | --- |
| First filter | Double filter capsule | 2.9 ml/min | |
| First filter | Single filter | 3.6 ml/min | 3.99 bar |
| Second filter | Double filter capsule | 3.8 ml/min | 4.19 bar |
| Second filter | Single filter | 4.1 ml/min | 4.08 bar |

The single filters were known to have integrity at the time of measurement. For the diffusion rate of the diffusion test, there are comparable values within the scope of the measurement accuracy, both for the first and for the second filter as a single filter and in the double filter capsule. Although the first filter in the double filter capsule was not tested for the bubble point of the bubble point test, the values for the second filter in the single filter assembly and in the double filter capsule show comparable values. All measured diffusion values are below the above upper limit and all measured bubble point values are above the above lower limit. Consequently, this proof-of-principle measurement shows that the integrity of both filters of the double filter capsule can be tested just as reliably using the method according to the invention as in the individual assembly.

Second Example of a Double Filter Capsule:

Two filters, each with a filter area of around 0.55 m², are tested for their integrity.
First filter: Sartopore 2, pore size 0.2 μm, BH1;
Second filter: Sartopore 2, pore size 0.2 μm, BH1.
Again, in this proof-of-principle test, two identical filters are installed in one housing, which, however, have a different filter area compared with the first example.

| | Assembly | Measured diffusion rate | Bubble point |
| --- | --- | --- | --- |
| First filter | Double filter capsule | 9.6 ml/min | 4.13 bar |
| First filter | Single filter | 10.5 ml/min | 3.93 bar |
| Second filter | Double filter capsule | 10.2 ml/min | 4.08 bar |
| Second filter | Single filter | 10.4 ml/min | 3.88 bar |

The second example also proves, on the basis of comparable values for diffusion and bubble point, that the method according to the invention can test two filters of a double filter capsule installed in one housing with the same reliability as a testing method of a single filter. In this example, the bubble point of the first filter in the double filter capsule was also recorded. Fluctuations in the values can be attributed to differences in the wetting of the pleated structures.

A further embodiment includes an integrity test for an assembly of a pre-filter (e.g. Sartopore 2, pore size 0.45 μm) integrated into a housing, followed by a sterile filter (Sartopore 2, pore size 0.2 μm).

B) Second Test Setup:

| First filter | Second filter |
| --- | --- |
| Sartopore 2, 0.45 μm BH9 | +Sartopore 2, 0.2 μm BH9 (double filter capsule) |

-continued

| First filter | Second filter |
|---|---|
| Sartopore 2, 0.45 µm BH1 | +Sartopore 2, 0.2 µm BH1 (double filter capsule) |

The two double filter capsules substantially differ in their overall height. Accordingly, two double filter capsules with different filter areas but the same combination of pore sizes are tested for their integrity. In this proof-of-principle test, for each double filter capsule, two non-identical filters are installed in one housing, which have different pore sizes and their integrity test is compared with two integrity tests of the respective individual identical filters.

The following limit values are available: for Sartopore 2, pore size 0.45 µm, test pressure 1.7 bar:

| BH9 | Diffusion rate: | <6 ml/min |
| | Bubble point: | >2.2 bar |
| BH1 | Diffusion rate: | <12 ml/min |
| | Bubble point: | >2.2 bar |

First Example of a Double Filter Capsule:
  First filter: Sartopore 2, pore size 0.45 µm, BH9;
  Second filter: Sartopore 2, pore size 0.2 µm, BH9.

| | Assembly | Measured diffusion rate | Bubble point |
|---|---|---|---|
| First filter | Double filter capsule | 2.3 ml/min | |
| First filter | Single filter | 2.2 ml/min | 2.83 bar |
| Second filter | Double filter capsule | 4.3 ml/min | |
| Second filter | Single filter | 4.0 ml/min | 4.09 bar |

Second Example of a Double Filter Capsule:
  First filter: Sartopore 2, pore size 0.45 µm, BH9;
  Second filter: Sartopore 2, pore size 0.2 µm, BH9.

| | Assembly | Measured diffusion rate | Bubble point |
|---|---|---|---|
| First filter | Double filter capsule | 2.5 ml/min | 2.95 bar |
| First filter | Single filter | 1.6 ml/min | 2.83 bar |
| Second filter | Double filter capsule | 5.9 ml/min | 4.28 bar |
| Second filter | Single filter | 3.8 ml/min | 3.73 bar |

In both examples, the respective two filters substantially differ in their pore size. In these two proof-of-principle tests, two non-identical filters with the same cylinder length (overall height) are installed in one housing, each with a different pore size. The integrity tests of the double filter capsules are compared with two integrity tests of each individual identical filter. In both examples, two filters, each with a filter area of around 0.18 m², are tested for their integrity.

Based on the relatively similar results of the diffusion tests for the double filter capsules and the individouble filters, it can also be shown in these two examples that the integrity test of the double filter capsule according to the invention works just as reliably as the integrity test of the individouble filters. All values are within the permissible range, limited by the limit values specified above.

Both the measurement data of the diffusion test and those of the bubble point test show that the integrity test of the double filter capsule according to the invention is also comparable with the integrity test of the individouble filters in the present example. All values are within the permissible range, limited by the above limit values. As mentioned above, deviations are due to differences in wetting, which cannot be avoided.

Third Example of a Double Filter Capsule:
  First filter: Sartopore 2, pore size 0.45 µm, BH1;
  Second filter: Sartopore 2, pore size 0.2 µm, BH1.

The two filters also substantially differ in their pore size. In this proof-of-principle test, two non-identical filters having different pore sizes are installed in one housing, and their integrity test is compared with two integrity tests of the respective individual identical filters. Two filters, each with a filter area of around 0.55 m², are tested for their integrity.

| | Assembly | Measured diffusion rate | Bubble point |
|---|---|---|---|
| First filter | Double filter capsule | 7.1 ml/min | |
| First filter | Single filter | 6.9 ml/min | 2.78 bar |
| Second filter | Double filter capsule | 10.3 ml/min | 4.08 bar |
| Second filter | Single filter | 11.8 ml/min | 3.99 bar |

The third example also shows that both the measurement data from the diffusion test and the bubble point test for the second filter show that the integrity test of the double filter capsule according to the invention is comparable with the integrity test of the individouble filters.

The examples mentioned demonstrate the feasibility and effectiveness of the method according to the invention and the comparability of the reliability of an integrity test with the respective integrity test of an individouble filter.

C) Third Test Setup

The following considers a case in which a filter was intentionally destroyed in order to demonstrate that the non-integrity of a filter can also be detected in a double filter capsule 10 just as reliably as in a single filter assembly.

First Example of a Double Filter Capsule:
  First filter: Sartopore 2, pore size 0.2 µm, BH9;
  Second filter: Sartopore 2, pore size 0.2 µm, BH9.

There was a gross defect in the second filter.

| | Assembly | Measured diffusion rate | Bubble point |
|---|---|---|---|
| First filter | Double filter capsule | 3.2 ml/min | 3.93 bar |
| First filter | Single filter | 3.0 ml/min | 3.58 bar |
| Second filter | Double filter capsule | Test stopped | Test stopped |
| Second filter | Single filter | Test stopped | Test stopped |

While the first filter, both in the single filter assembly and in the double filter capsule, was determined to be intact, the integrity measuring device automatically stopped the test for the second non-integrity filter, both in the single filter assembly and in the double filter capsule. This example is intended to demonstrate that the integrity test according to the invention can also reliably determine the non-integrity of a defective filter in a double filter capsule, both by means of a diffusion test and by means of a bubble point test.

Thus, the feasibility and effectiveness of the integrity test according to the invention was demonstrated in various examples.

LIST OF REFERENCE NUMERALS 10 double filter capsule
12 housing
14 inlet
16 outlet
18 first filter
19 intermediate filter or first/second filter
20 second filter
22 antechamber
23 antechamber or (first) interspace
24 (second) interspace
26 core
28 filter structure
30 backflow preventer
32 exterior space of the first filter
34 interior space of the first filter
36 exterior space of the second filter
38 interior space of the second filter
40 end wall, base cap
42 intermediate wall
44 antechamber access
45 antechamber access or (first) interspace access
46 (second) interspace access
48 connecting line
50 test device line
52 test fluid filter
M medium to be filtered
M' partially filtered medium
M" filtered medium
BM wetting medium
TG test gas

The invention claimed is:

1. A method for conducting an integrity test of a double filter capsule, comprising:
providing the double filter capsule with a housing in which a first filter and a second filter are arranged one after the other in the flow direction of a medium to be filtered such that in a filtration process the medium to be filtered flows in its flow direction from an antechamber in the housing through the first filter into an interspace between the first filter and the second filter and onward through the second filter to an outlet, the housing having an antechamber access for supplying a test fluid into the antechamber and an interspace access for supplying the test fluid into the interspace;
providing a connecting line between the antechamber access and the interspace access for fluidic connection between the antechamber and the interspace, wherein at least the fluidic connection to the interspace is configured to close;
determining the integrity state of the double filter capsule based on at least the following two test phases:
a first test phase, comprising: supplying the test fluid into the antechamber with the fluidic connection of the connecting line to the interspace closed and carrying out a first integrity check; and
a second test phase, comprising: simultaneously supplying the test fluid into the antechamber and via the interspace access into the interspace, while the antechamber is fluidically connected to the interspace via the connecting line such that pressure equalization takes place between the antechamber and the interspace, and carrying out a second integrity check.

2. The method according claim 1, wherein the double filter capsule is provided such that the housing also has an inlet for supplying the medium to be filtered into the antechamber.

3. The method according to claim 1, wherein the test fluid is a test gas and wherein the method, prior to determining the integrity state of the double filter capsule, comprises wetting the first filter and/or the second filter with a wetting medium.

4. The method according to claim 1, wherein the first integrity check and/or the second integrity check comprises one or more of the following test processes:
a bubble point test;
a diffusion test;
a pressure hold test.

5. The method according claim 1, wherein the first test phase is carried out in a dynamic mode in which the first integrity check is carried out within such a short time after supply of the test fluid into the antechamber or after a pressure build-up of the test fluid in the antechamber such that this time is substantially shorter than a ratio of the compressible volume in the interspace and the volumetric flow rate of the test fluid through the first filter during the first integrity check.

6. The method according to claim 1, wherein the first test phase is carried out in a stationary mode in which during the first integrity check as much test fluid is continuously supplied via the antechamber access as it passes through the first filter and the second filter in order to exit via the outlet.

7. The method according to claim 1, wherein the pressurized fluid is supplied to the antechamber and/or the interspace via a sterile filter.

8. The method according to claim 1, wherein the first filter and the second filter are filter candles with:
a substantially cylinder barrel-shaped core;
a filter structure surrounding the core and having a filter membrane; and
a substantially cylinder-barrel-shaped shell surrounding the filter structure and the core, are or will be arranged in the housing such that during a filtration process the medium to be filtered flows in its flow direction through the respective filter membrane of the first and second filters substantially radially from the outside to the inside.

9. The method according to claim 1, wherein the first and/or second filter comprises a pleated filter structure.

10. The method according to claim 1, wherein the first filter comprises a first filter membrane with pores and the second filter comprises a second filter membrane with pores such that a pore size of the first filter membrane and a pore size of the second filter membrane have a value in the range from 0.05 µm to 0.4 µm.

11. The method according to claim 10, wherein the pore size of the first filter membrane and the pore size of the second filter membrane have a value in the range from 0.1 µm to 0.2 µm.

12. The method according claim 1, wherein the first filter comprises a first filter membrane having pores and the second filter comprises a second filter membrane having pores such that a pore size of the first filter membrane is larger than a pore size of the second filter membrane.

13. The method according to claim 12, wherein
the pore size of the first filter membrane has a value in the range from 0.3 µm to 0.6 µm; and
the pore size of the second filter membrane has a value in the range from 0.1 µm to 0.3 µm.

14. The method according to claim 13, wherein the pore size of the second filter membrane has a value in the range from 0.1 µm to 0.2 µm.

15. A system for conducting an integrity test, comprising:

a double filter capsule with a housing in which a first filter and a second filter are arranged one after the other in the flow direction of a medium to be filtered such that in a filtration process the medium to be filtered flows in its flow direction from an antechamber in the housing through the first filter into an interspace between the first filter and the second filter and onward through the second filter to an outlet, the housing having an antechamber access for supplying a test fluid into the antechamber and an interspace access for supplying the test fluid into the interspace;

a connecting line between the antechamber access and the interspace access for fluidic connection between the antechamber and the interspace, wherein at least the fluidic connection to the interspace is configured to close; and an integrity check device designed to conduct the following two test phases and, based thereon, to determine an integrity state of the double filter capsule:

a first test phase, comprising: supplying the test fluid into the antechamber with the fluidic connection of the connecting line to the interspace closed and carrying out a first integrity check; and a second test phase, comprising: simultaneously supplying the test fluid into the antechamber and via the interspace access into the interspace, while the antechamber is fluidically connected to the interspace via the connecting line such that pressure equalization takes place between the antechamber and the interspace, and carrying out a second integrity check.

* * * * *